Jan. 25, 1944.　　　　K. H. REDD　　　　2,339,948
LAWN MOWER ATTACHMENT
Filed Feb. 11, 1943　　　3 Sheets-Sheet 1
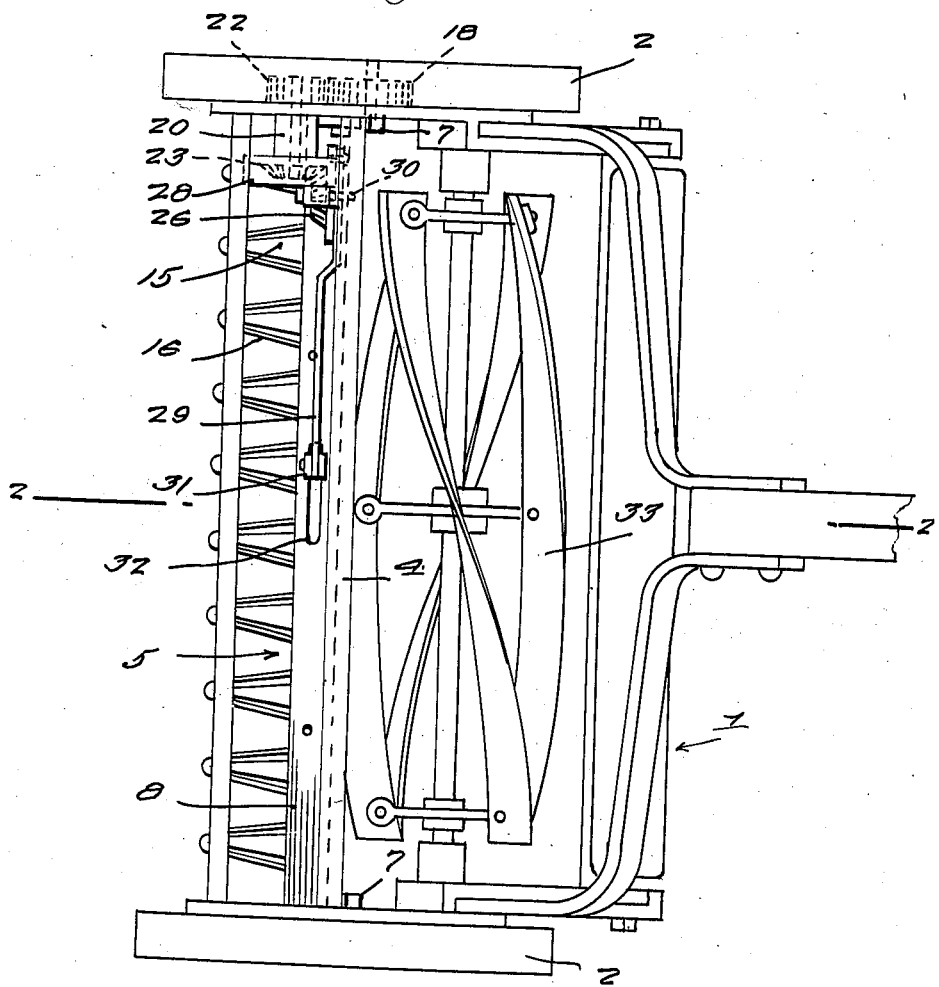
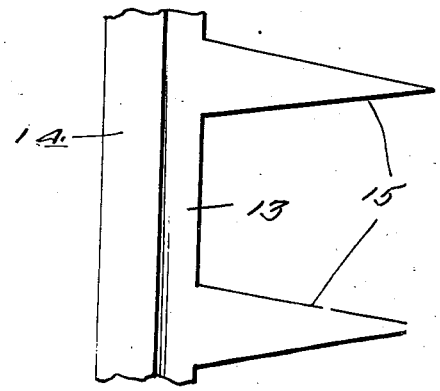
Inventor
Kilby H. Redd
By Clarence A. O'Brien
and Harvey B. Jacobson
Attorneys

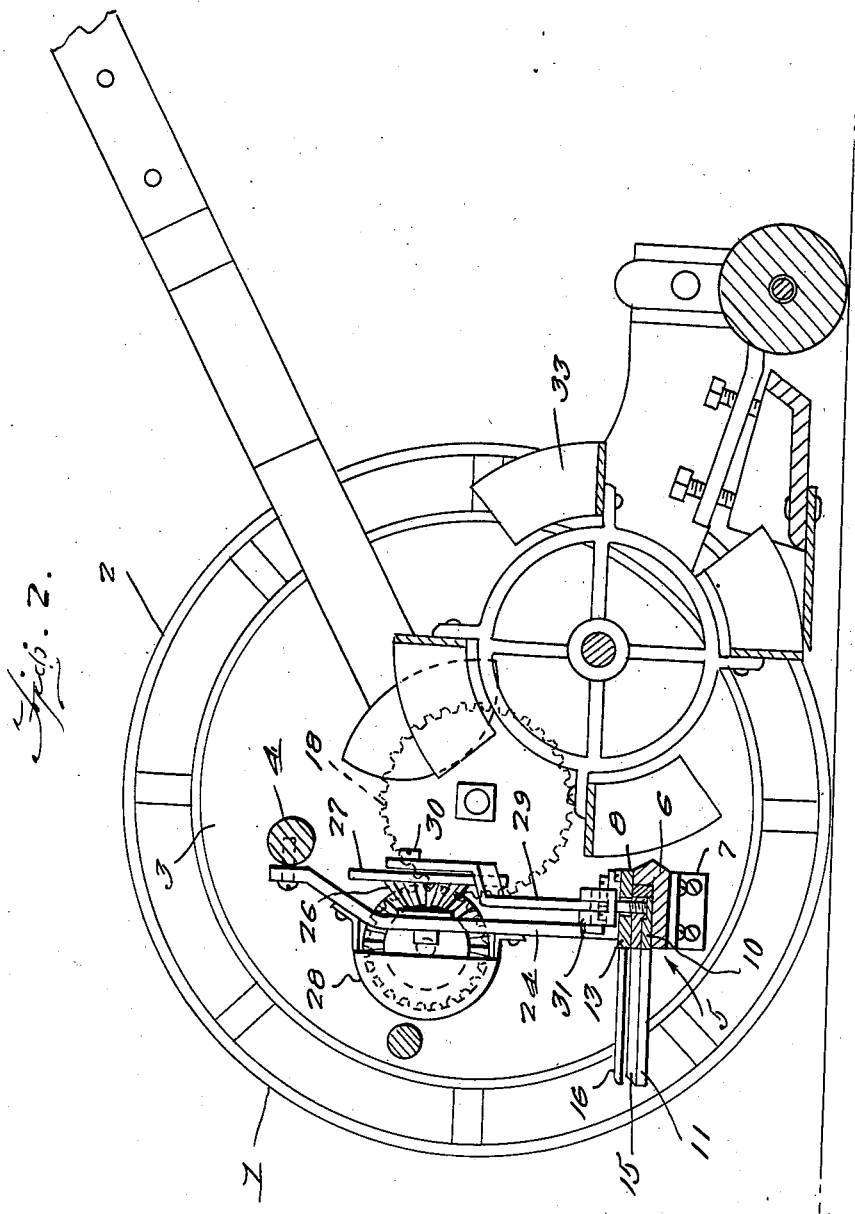

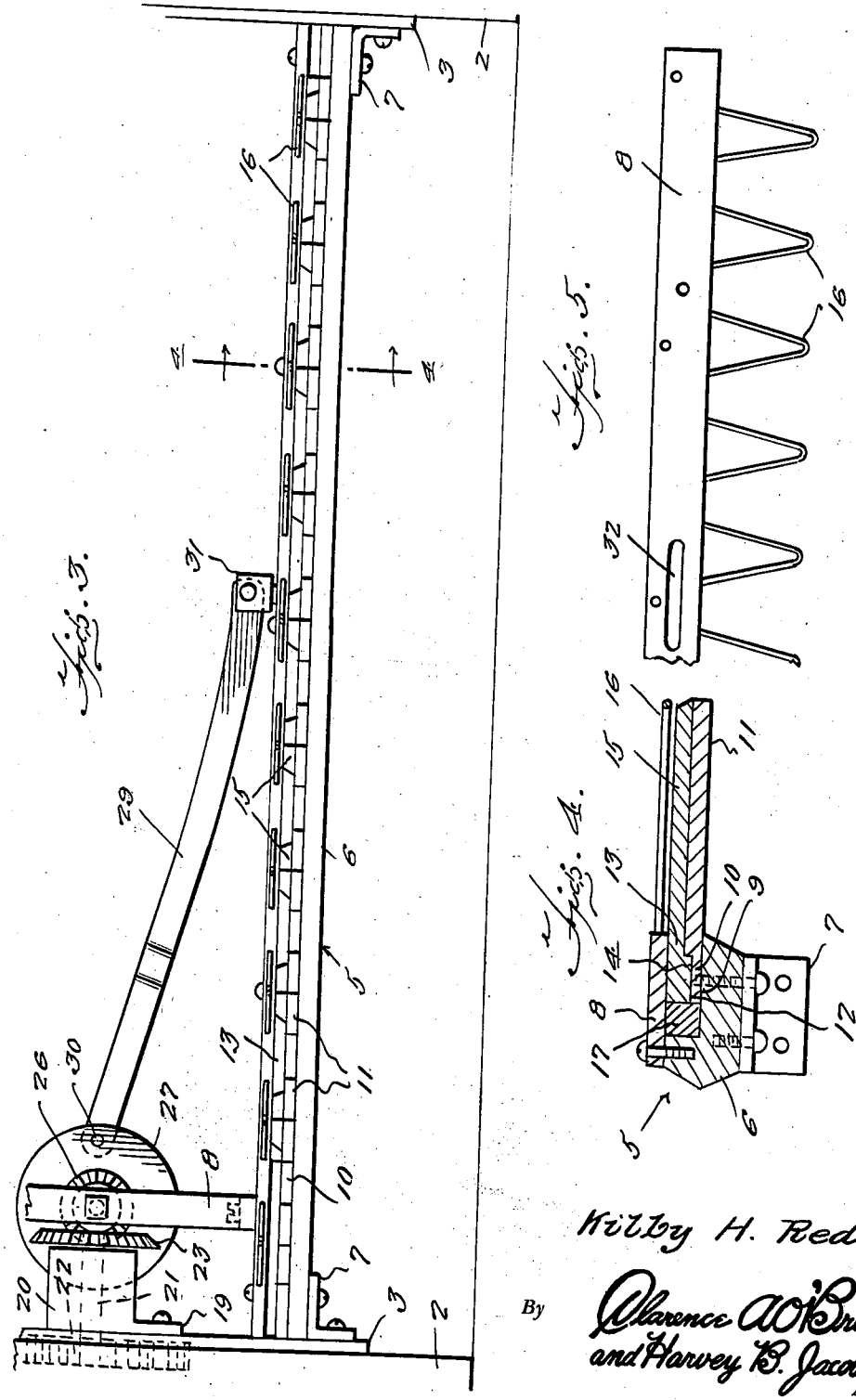

Patented Jan. 25, 1944

2,339,948

UNITED STATES PATENT OFFICE 2,339,948

LAWN MOWER ATTACHMENT

Kilby H. Redd, Galax, Va.

Application February 11, 1943, Serial No. 475,533

2 Claims. (Cl. 56—238)

The present invention relates to new and useful improvements in lawn mowers, and has for primary object to provide, in a manner as hereinafter set forth, an attachment in the form of an auxiliary cutter which is adapted to cut weeds, grass, et cetera, which are too high for the usual rotary cutting reel of the machine.

Another very important object of the invention is to provide an auxiliary cutting attachment of the aforementioned character which is adapted to be expeditiously mounted for operation on a conventional lawn mower without the necessity of making material structural alterations therein.

Still another very important object of the invention is to provide an auxiliary cutting attachment for lawn mowers comprising a sickle of unique construction.

Other objects of the invention are to provide a lawn mower attachment of the character described which will be comparatively simple in construction, strong, durable, highly efficient and reliable in operation, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a lawn mower equipped with an attachment constructed in accordance with the present invention.

Figure 2 is a view in vertical longitudinal section, taken substantially on the line 2—2 of Figure 1.

Figure 3 is a view in front elevation of the attachment.

Figure 4 is a cross sectional view through the sickle, taken substantially on the line 4—4 of Figure 3.

Figure 5 is a top plan view of a portion of the guard bar of the sickle.

Figure 6 is a bottom plan view of an intermediate portion of the reciprocating cutter.

Referring now to the drawings in detail, it will be seen that reference numeral 1 designates generally the head of a conventional lawn mower. The lawn mower 1 includes the usual traction wheels 2 which are rotatable on the side frames or members 3. Extending between the upper portions of the members 3 is a rod 4.

The embodiment of the present invention which has been illustrated includes a sickle which is designated generally by reference numeral 5. The sickle 5 comprises a stationary lower bar 6 which extends between the lower portions of the members 3 and which is mounted thereon through the medium of brackets 7. A stationary upper bar 8 is mounted on the bar 6.

The upper forward portion of the bar 6 is recessed, as at 9, to accommodate a stationary cutter bar 10. Blades 11 project forwardly from the bar 10. The upper face of the bar 10 has formed longitudinally in its rear portion a recess 12.

A reciprocating cutter bar 13 is slidably mounted on the bar 10 beneath the bar 8. The reciprocating cutter bar 13 includes a depending longitudinal rib or the like 14 which is slidably engaged in the recess 12. Blades 15 project forwardly from the bar 13 for coaction with the stationary blades 11. Substantially V-shaped wire guards 16 for the blades 11 and 15 project forwardly from the bar 8. A filler 17 of suitable metal is mounted in the recess 9 rearwardly of the bars 10 and 13.

A gear 18 is fixed on the hub portion of one of the mower wheels 2 on the inner side thereof. Secured by an attaching arm 19 on the adjacent member 3 of the mower 1 is a bearing 20 having journaled therein a transverse shaft 21. A gear 22 on one end portion of the shaft 21 is driven by the gear 18. Fixed on the other end portion of the shaft 21 is a beveled gear 23.

Extending between the rod 4 of the lawn mower 1 and the bar 8 of the sickle 5 is a bar 24. Projecting rearwardly from the bar 24, at an intermediate point, is a spindle or the like 25. A beveled gear 26, which is driven by the gear 23, is journaled on the spindle 25. A disk 27 is fixed on the gear 26. A guard 28 for the gear 23 is mounted on the bar 24. A pitman 29 operatively connects the disk 27 to the reciprocating cutter bar 13 of the sickle 5.

One end of the pitman 29 is connected off center to the disk 27, as at 30. The other end portion of the pitman 29 is pivotally connected to a knuckle or the like 31 which is mounted on the reciprocating cutter bar 13. A slot 32 (see Fig. 5) in the bar 8 accommodates the member 31.

It is thought that the operation of the attachment will be readily apparent from a consideration of the foregoing. Briefly, as the lawn mower 1 is pushed forwardly over the ground, the sickle 5 is actuated by one of the wheels 2 of said mower. This, of course, is accomplished through the pitman 29, the disk 27, the gears 26, 23, 22, 18, et cetera. The sickle 5 is located forwardly of the usual cutting reel 33 of the mower 1 in a position to cut weeds, grass, et cetera, which are too high for said reel.

It is believed that the many advantages of a lawn mower attachment constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. An auxiliary cutting attachment for lawn mowers of the type including side frame members, traction wheels, a rotary reel mounted between the members and a rod extending between said members, comprising a sickle mounted between the members forwardly of the reel, a bar extending between said sickle and the rod, a gear rotatably mounted on said bar, a disk fixed on said gear, a pitman having one end connected off center to the disk and its other end connected to the sickle, and means operatively connecting said gear to one of the wheels of the mower, said means including a bearing mounted on one of the frame members, a shaft journaled in said bearing, gears fixed on the end portions of said shaft, one of the second-named gears being engaged with the first-named gear, and a gear fixed on the hub portion of said one wheel and engaged with the other of the second-named gears.

2. An auxiliary cutting attachment for lawn mowers of the type including a pair of side frame members and traction wheels, comprising brackets mounted on said side frame members, a sickle mounted on the brackets, said sickle including stationary upper and lower bars, the lower bar being secured to the brackets and having a recess in its upper forward portion, stationary and reciprocating cutter bars mounted in the recess between the stationary upper and lower bars, coacting blades projecting forwardly from the cutter bars, substantially V-shaped guards for the blades projecting forwardly from the stationary upper bar, and means operatively connecting the reciprocating cutter bar to one of the wheels of the mower.

KILBY H. REDD.